United States Patent

Sawyer et al.

[11] Patent Number: 5,915,221
[45] Date of Patent: Jun. 22, 1999

[54] NEIGHBOR CELL LIST CREATION AND VERIFICATION IN A TELECOMMUNICATIONS SYSTEM

[75] Inventors: Francois Sawyer, St. Hubert; Andre Beliveau, Laval, both of Canada

[73] Assignee: Telefonaktiebolaget LM Ericsson, S-126 25 Stockholm, Sweden

[*] Notice: This patent issued on a continued prosecution application filed under 37 CFR 1.53(d), and is subject to the twenty year patent term provisions of 35 U.S.C. 154(a)(2).

[21] Appl. No.: 08/512,449

[22] Filed: Aug. 8, 1995

[51] Int. Cl.$^6$ .................................................. H04Q 7/20
[52] U.S. Cl. ........................................ 455/437; 455/438
[58] Field of Search .................. 455/33.1, 33.2, 455/54.1, 56.1, 63, 67.1, 67.3, 422, 436, 437, 438, 450, 524, 525; 379/59, 60

[56] References Cited

U.S. PATENT DOCUMENTS

| | | | |
|---|---|---|---|
| 5,023,900 | 6/1991 | Tayloe et al. | 379/32 |
| 5,042,082 | 8/1991 | Dahlin | 455/33 |
| 5,095,500 | 3/1992 | Tayloe et al. | 379/32 |
| 5,161,249 | 11/1992 | Meche et al. | 455/33.3 |
| 5,200,957 | 4/1993 | Dahlin | 370/100.1 |
| 5,222,249 | 6/1993 | Carney | 455/33.2 |
| 5,230,082 | 7/1993 | Ghisler et al. | 455/33.2 |
| 5,239,682 | 8/1993 | Strawcynski et al. | 455/54.1 |
| 5,267,261 | 11/1993 | Blakeney, III et al. | 375/455 |
| 5,309,503 | 5/1994 | Bruckert et al. | 379/60 |
| 5,327,575 | 7/1994 | Menich et al. | 455/33.2 |
| 5,379,447 | 1/1995 | Bonta et al. | 455/33.2 |
| 5,390,339 | 2/1995 | Bruckert et al. | 455/33.2 |
| 5,422,933 | 6/1995 | Barnett et al. | 379/60 |
| 5,423,064 | 6/1995 | Sakata | 455/33.2 |
| 5,428,816 | 6/1995 | Barnett et al. | 455/33.2 |
| 5,432,842 | 7/1995 | Kinoshita et al. | 379/60 |
| 5,432,843 | 7/1995 | Bonta | 379/60 |
| 5,509,051 | 4/1996 | Barnett et al. | 455/33.2 |
| 5,594,949 | 1/1997 | Andersson et al. | 455/437 |
| 5,722,073 | 2/1998 | Wallstedt et al. | 455/437 |

FOREIGN PATENT DOCUMENTS

| | | |
|---|---|---|
| 0492800 | 11/1991 | European Pat. Off. . |
| 2250665 | 10/1991 | United Kingdom . |
| WO9319560 | 9/1993 | WIPO . |

*Primary Examiner*—Nguyen Vo
*Attorney, Agent, or Firm*—Jenkens & Gilchrist PC

[57] ABSTRACT

A method and system for neighbor cell list creation and verification in a telecommunications system is provided. Over a period of time measurements are performed on signals transmitted and received on measurement channels of cells neighboring the cell for which a neighbor cell list is being created. The results of the signal measurements are used to create an ordered list of the measurement channels on which the measurements were done. A neighbor cell list containing a desired number of cells is then created by placing a certain number of cells having the most interfered measurement channels in the neighbor cell list. The invention also presents a method and system for verifying an existing neighbor cell list. In the method and system measurements are performed on measurement channels of neighbor cells over a period of time. Periodically the measurement results are checked to determine if cells should be added to or deleted from the existing neighbor cell list.

16 Claims, 6 Drawing Sheets

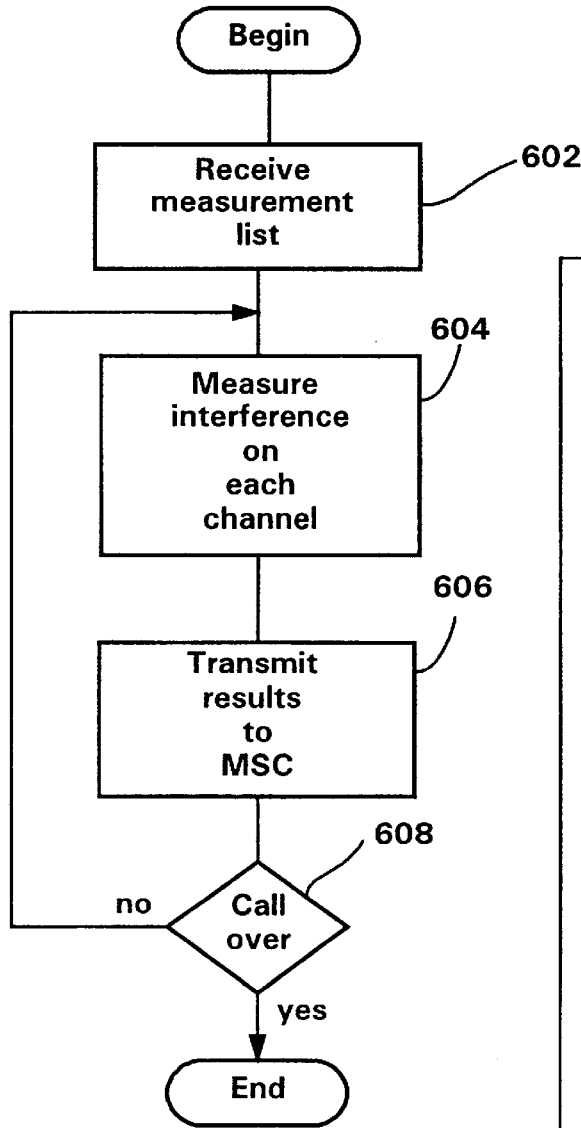
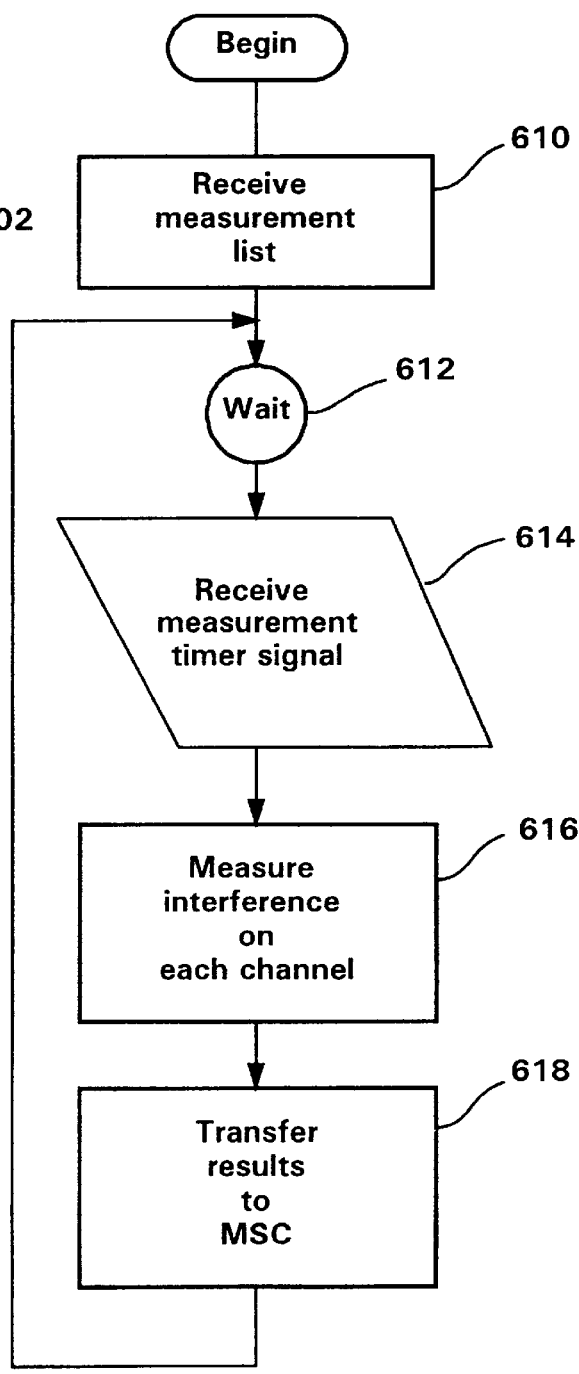

Least interfered

| 1 |
| 60 |
| 58 |
| 20 |
| 34 |
| 47 |
| 55 |
| 29 |
| 7 |
| 12 |
| 33 |
| ⋮ |
| 28 |
| 49 |
| 63 |
| 21 |
| 56 |
| 35 |
| 42 |

Most interfered

FIG. 5

NEIGHBOR CELL LIST CREATION AND VERIFICATION IN A TELECOMMUNICATIONS SYSTEM

BACKGROUND OF THE INVENTION

1. Field of the Invention

This invention relates to mobile telecommunications systems, and more particularly, to a method and system for building a neighbor cell measurement channel list for mobile station handoff.

2. Description of the Prior Art

In a cellular mobile telecommunications system the user of a mobile station communicates with the system through a radio interface while moving about the geographic coverage area of the system. The radio interface between the mobile station and system is implemented by providing base stations dispersed throughout the coverage area of the system, each capable of radio communication with the mobile stations operating within the system. In a typical mobile telecommunications system each base station of the system controls communications within a certain geographic coverage area ideally represented by a hexagonal shape termed a cell, and a mobile station which is located within a particular cell communicates with the base station controlling that cell. When a call is initiated by the user of a mobile station, or received at the system for a mobile station, the call is set up on radio channels assigned to the base station controlling the cell in which the mobile station is located. If the mobile station moves away from the original cell in which the call was setup and the signal strength on the radio channels of the original cell weakens, the system will affect transfer of the call to radio channels of a base station controlling a neighboring cell into which the mobile station moves. As the mobile station user continues to move throughout the system, control of the call may be transferred from the neighboring cell to another cell. This transfer of the call from cell to cell is termed handover or handoff.

Handoff can only be effective if the call is transferred to radio channels that provide adequate signal strength for two way communications. This requires sufficient signal strength at both the receiver of the mobile station and receiver of the base station to which handoff is made. The signals must also be sufficiently strong in relation to any noise or interference that is present in the network. For effective handoff it is necessary that some sort of signal strength or interference level measurement process be used to determine which of the neighboring cells is to be selected for handoff. In existing systems the measurement process is done by either making measurements at the receivers of neighboring base stations on signals transmitted from the mobile station, or by making measurements at the receiver of the mobile station on signals transmitted from neighboring base stations. The latter method requires that the mobile station be a part of the measurement process used to select a cell for handoff.

In analog cellular systems operating according to the EIA/TIA—553 Mobile Station—Land Station Compatibility Specification (AMPS) handoff measurements are done solely at neighboring base stations. When signal measurements made at the base station providing coverage in the current cell indicate that the strength of the signal received from a mobile station involved in a call has fallen below a certain threshold, the base station informs the mobile switching center (MSC) in control of the system or system area in which the cell is located. The MSC then initiates the handoff measurement process. The MSC orders base stations of neighboring cells to monitor the signal transmitted by the mobile station on the current radio channel assigned to the call, and measure the strength of the signal. After receiving the measurement results from each base station that received the measurement order, the MSC will then initiate handoff of the call from the current cell to the cell containing the base station reporting the highest received signal strength. The MSC uses a "neighbor cell list" that is associated with the current cell to determine which base stations receive the measurement order from the MSC. The neighbor cell list is created and set manually by the system operator and remains fixed until the operator later manually modifies the list. This type of handoff measurement process requires a large amount of signaling traffic between the MSC and the base stations of the cells contained in the neighbor cell list. This signaling traffic further consumes many processing and signaling link resources. For this reason the number of cells included in the neighbor cell list must be limited. The list is typically configured to include the cells which immediately border the current cell. If hexagonal cell shapes of identical size are used to model the system cells' coverage area there will be six bordering cells.

The nature of the operation of digital cellular communications systems, as opposed to analog cellular systems, allows that the handoff measurement process be performed at the mobile station. An example of these types of systems, are systems operating according to the IS-54B EIA/TIA Cellular System Dual-Mode Mobile Station (IS-54B)—Base Station Compatibility Standard. In IS-54B systems the time division multiple access (TDMA) signal transmission mode is used. In TDMA, communications between a base station and a particular mobile station are transmitted on radio channels that also may be used for communications between the same base station and up to two different mobile stations. The communications are carried out through data or digitized voice signals that are transmitted as bursts in timeslots that are time multiplexed on the radio channels. Each mobile station in communication with a base station is assigned a timeslot on both the reverse channel and forward channels. The assigned timeslots are unique to each mobile station so communications between different mobiles do not interfere with each other. The handoff process in IS-54B is known as mobile assisted handoff (MAHO). In MAHO handoff measurement is done at the mobile station during the times when the mobile station is neither transmitting in the assigned reverse channel timeslot nor receiving in the assigned forward channel timeslot. During the times between signal bursts in an ongoing call, the mobile station periodically monitors radio channels of each base station located in close proximity. The control channel of each neighboring base station is typically used as the measurement channel. For each ongoing call the measurement channels are contained in the neighbor cell list of the cell in which the call is proceeding. In addition to measuring the measurement channels of neighboring base stations, the mobile station also measures the received signal strength on the current channel on which the call is proceeding. The mobile station measures the received signal strength on these radio channels and transmits the measurement results to the current base station. The current base station then forwards these measurement results to the MSC. If the received signal strength on the current channel falls below the received signal strength on a measurement channel of a neighboring cell the MSC initiates handoff to that neighboring cell.

The analog control channels (ACCH) of the neighboring cells are used as the measurement channels for IS-54B MAHO. With the introduction of the new IS-136 EIA/TIA Cellular System Dual-Mode Mobile Station—Base Station Compatibility Standard (IS-136), which is essentially the IS-54B standard with a digital control channel introduced, it is also possible to use a digital control channel (DCCH) for MAHO measurements.

Because MAHO is performed mostly within the mobile station the resources for carrying out the process are limited. IS-54B or IS-136 mobile stations can perform only fifty measurements per second. Radio conditions such as Rayleigh fading, shadowing, etc. are such that it is necessary to average measurements in order to provide a reliable signal strength value. Therefore it is necessary to limit the number of cells that comprise the neighbor cell list for MAHO measurement purposes to much less than fifty cells. The IS-54B standard limits the size of the neighbor cell list to twelve cells. IS-136 sets a size limit of twenty four. The increase in the size of the list in IS-136 over IS-54B has limited effect because the limit of fifty measurements per second still holds and any increase in the number of cells in the list dilutes signal strength measurement precision on any given measurement channel.

When a system operator creates a neighbor cell list for a cell he attempts to ensure that calls in the cell can be handed over to a second cell, no matter what type of movement takes place. One of the difficulties in creating a neighbor cell list is that the actual coverage area of a cell is difficult to predict. The size and shape of a cell's coverage area may vary due to various effects. Examples of such effects are, base station antennas being located in different positions, or shadowing effects on radio coverage caused by obstacles such as buildings. Although the ideal representation of the coverage area of a cell may be a hexagonal cell having six neighbors of identical shape, the actual coverage areas of cells have differing sizes and shapes. The best candidate cell for handoff may not always be one of the six bordering cells as depicted in the ideal representation when cells within a system are modeled as being of equal size. It is possible that the best candidate for handoff would be a cell located beyond the six bordering cells. In the ideal representation this could be one of the twelve cells adjacent to the ring formed by the six bordering cells. Since it is difficult to predict the actual coverage area of each individual cell in a system, it would be very difficult to create a neighbor cell list for the handoff process in the above situation. Without knowing the actual coverage area of the base stations it would be necessary to include all eighteen of these cells in the neighbor cell list to create the most accurate list for handoff measurements. In EIA/TIA—553 and IS-54B systems it is not possible to include all of these eighteen cells in the neighbor cell list. In IS-136 systems, although the standard allows eighteen cells in the neighbor cell list, the number is excessive and the precision of signal strength measurements would not be as great as it could be.

It would provide an advantage then in a cellular system to have a method and system for creating a neighbor cell list that accounts for the differing coverage areas of cells. A method and system of this type would allow creation of a neighbor cell list that would contain the best possible candidate cells for handoff of a call. The method and system would also allow creation of a neighbor cell list of a size that allowed accurate handoff signal strength measurements, while still providing the best possible candidate cells for a list of that size. Automation of the method and system would free the system operator from having to manually create a neighbor cell list for a new cell or, from having to manually reconfigure the neighbor cell list of affected cells when a new cell is added to a system. The present invention provides such a method and system.

SUMMARY OF THE INVENTION

In order to overcome the deficiencies and shortcomings of the prior art, the present invention provides a method and system for creating a neighbor cell list for a cell within a cellular system. The neighbor cell list created according to the teachings of the present invention accounts for the fact that coverage areas of cells differ from the ideal coverage area that is represented by a hexagonal shaped cell. This neighbor cell list may be used during the process of handing off a call from the cell for which the list was created to one of its nearby neighbor cells. By using the neighbor cell list of the invention during handoff a more accurate and efficient handoff than is obtainable with a neighbor cell list created by existing methods can be obtained. Existing methods of neighbor cell creation do not account for the fact that coverage areas of nearby neighbor cells within the cellular system cannot be accurately predicted.

The method and system utilizes signal measurements performed within the coverage area of a cell to create the neighbor cell list for that cell. An initial neighbor cell list for the cell for which the neighbor cell list is to be created is initially used for handoff measurement orders. The initial neighbor cell list comprises one or more of the immediately adjacent cells. Over a period of time, as communications take place within the system, measurements are performed on signals transmitted and received on measurement channels of nearby cells not contained in the initial neighbor cell list. The results of the signal measurements are then used to create an ordered list of the measurement channels on which the measurements were done. Then, a neighbor cell list containing a desired number of cells is created by adding a certain number of cells having the highest signal strength on their measurement channel to the initial neighbor cell list.

Signal measurements are performed at one or more mobile stations located within the coverage area of the cell for which the neighbor cell list is being created. The mobile stations measure the signal interference on base to mobile (downlink) transmissions on the measurement channels of base stations that control the nearby cells. Additional signal measurements are also performed at the base station controllPatent Appverage area of the cell for which the neighbor cell list is being created. The base station measures the signal quality of mobile to base (uplink) transmissions on the measurement channels of base stations that control the nearby cells.

The method and system may also be used for verifying an existing neighbor cell list. In this aspect of the invention, signal measurements are performed within the coverage area of a cell on measurement channels of neighboring cells. The results of the signal measurements are then used to reconfigure an existing neighbor cell list to include the best candidate cells for handoff.

BRIEF DESCRIPTION OF THE DRAWINGS

FIGS. 4A–4C are flow diagrams illustrating steps performed within the mobile station, base station and mobile switching center, respectively, in accordance with an embodiment of the invention; and FIG. 5 shows a table of channel numbers built according to the teachings of the present invention.

DETAILED DESCRIPTION

Figure 1:
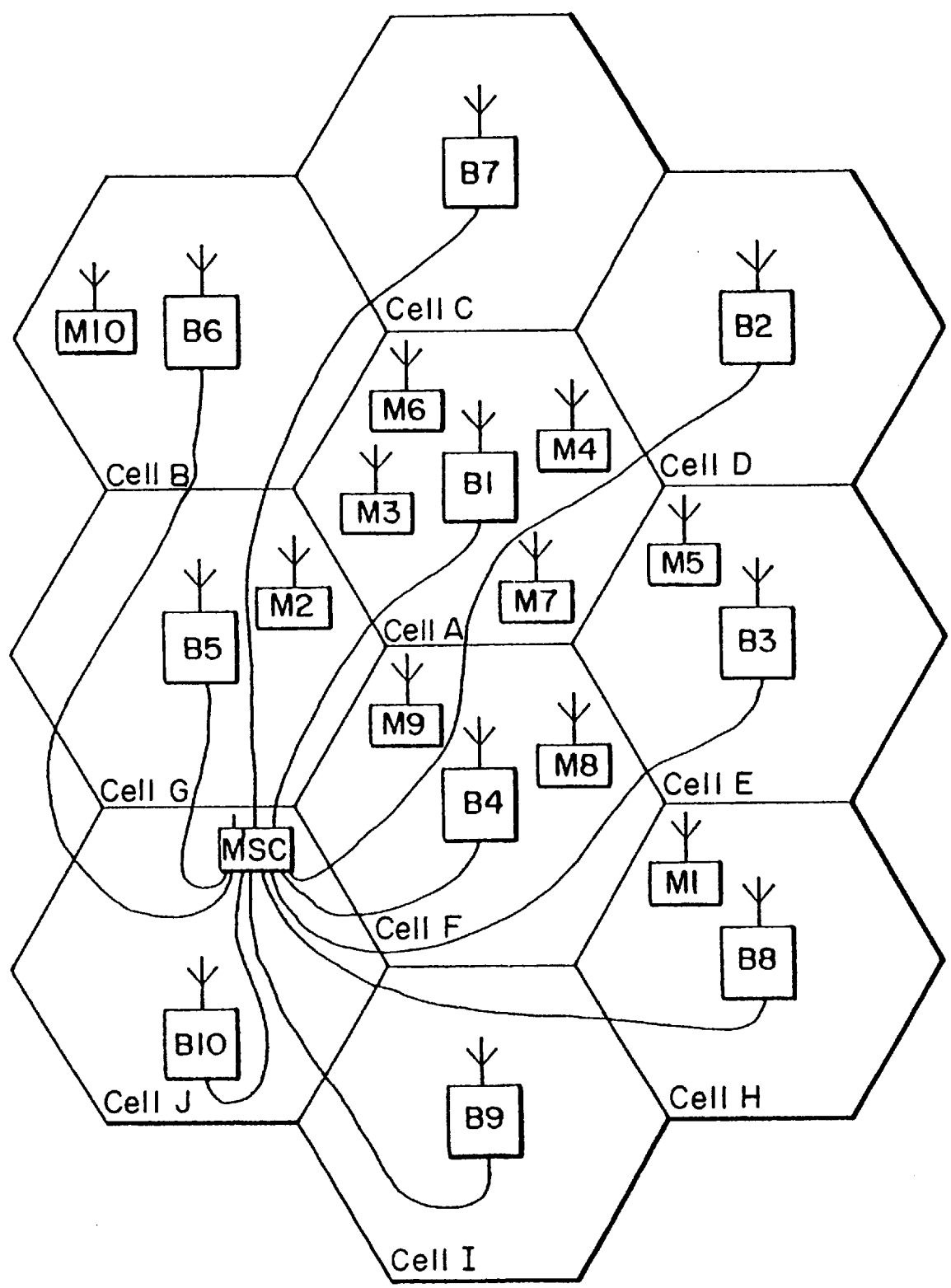
FIG. 1 illustrates ten cells within a cellular telecommunications system of the type to which the present invention generally pertains.

Referring to FIG. 1, there is shown a portion of a conventional cellular radio communication system of the type to which the present invention generally pertains. In FIG. 1, an arbitrary geographic area may be divided into a plurality of contiguous radio coverage areas, or cells Cell A–Cell J. While the system of FIG. 1 is illustratively shown to include only ten cells, it should be clearly understood that in practice, the number of cells will be much larger.

Associated with and located within each of Cell A–Cell J is a base station designated as a corresponding one of a plurality of base stations B1–B10. Each of the base stations B1–B10 includes a transmitter, a receiver, and a base station controller as are well known in the art. In FIG. 1, the base stations B1–B10 are illustratively located at the center of each of Cell A–Cell J, respectively, and are equipped with omni-directional antennas. However, in other configurations of the cellular radio system, the base stations B1–B10 may be located near the periphery, or otherwise away from the center of the Cell A–Cell J and may illuminate Cell A–Cell J with radio signals either omni-directionally or directionally. Therefore, the representation of the cellular radio system of FIG. 1 is for purposes of illustration only and is not intended as a limitation on the possible implementations of the cellular radio system within which the present invention is implemented.

With continuing reference to FIG. 1, a plurality of mobile stations M1–M10 may be found within Cell A–Cell J. Each of the mobile stations M1–M10 includes a transmitter, a receiver, and a mobile station controller as are well known in the art. Again, only ten mobile stations are shown in FIG. 1 but it should be understood that the actual number of mobile stations will be much larger in practice and will invariably greatly exceed the number of base stations. Moreover, while none of the mobile stations M1–M10 may be found in some of Cell A–Cell J, the presence or absence of the mobile stations M1–M10 in any particular one of Cell A–Cell J should be understood to depend in practice on the individual desires of the mobile stations M1–M10 who may roam from one location in the cell to another or from one cell to an adjacent cell or neighboring cell, and even from one cellular radio system served by an MSC to another such system.

Each of the mobile stations M1–M10 is capable of initiating or receiving a telephone call through one or more of the base stations B1–B10 and a mobile station switching center (MSC). A mobile station switching center (MSC) is connected by communication links, e.g., cables, to each of the illustrative base stations B1–B10 and to the fixed public switched telephone network (PSTN), now shown, or a similar fixed network which may include an integrated system digital network (ISDN) facility. The relevant connections between the mobile station switching center (MSC) and the base stations B1–B10, or between the mobile station switching center (MSC) and the PSTN or ISDN, are not completely shown in FIG. 1 but are well known to those of ordinary skill in the art. Similarly, it is also known to include more than one mobile station switching center in a cellular radio system and to connect each additional mobile station switching center to a different group of base stations and to other mobile station switching centers via cable or radio links.

Each MSC may control in a system the administration of communication between each of the base stations B1–B10 and the mobile stations M1–M10 in communication with it. As a mobile station roams about the system, the mobile station registers its location with the system through the base stations that control the area in which the mobile station is located. When the mobile station telecommunications system receives a call addressed to a particular mobile station, a paging message addressed to that mobile station is broadcast on control channels of the base stations which control the area in which the mobile station is believed to be located. Upon receiving the paging message addressed to it, the mobile station scans system access channels and sends a page response to the base station from which it received the strongest access channel signal. The process is then initiated to create the call connection. The MSC controls the paging of a mobile station believed to be in the geographic area served by its base stations B1–B10 in response to the receipt of a call for that mobile station, the assignment of radio channels to a mobile station by a base station upon receipt of a page response from the mobile station, as well as the handoff communications with a mobile station from one base station to another in response to the mobile station traveling through the system, from cell to cell, while communication is in progress.

Each of Cell A–Cell J is allocated a plurality of voice or speech channels and at least one control channel, such as an analog control channel (ACCH) or digital control channel (DCCH). The control channel is used to control or supervise the operation of mobile stations by means of information transmitted to and received from those units. Such information may include call originations, page signals, page response signals, location registration signals and voice channel assignments.

The present invention involves implementation of a method and system for creating an accurate neighbor cell list to be used for handoff in a cellular system similar to that shown in FIG. 1.

In an embodiment of the invention, the method and system is implemented into a cellular system like that shown in FIG. 1 that operates according to the IS-136 standard. The IS-136 standard is hereby incorporated by reference. In this first embodiment of the invention the DCCH channels assigned to each cell of the system for control purposes are also used as the measurement channels for neighbor cell list purposes.

Figure 2:
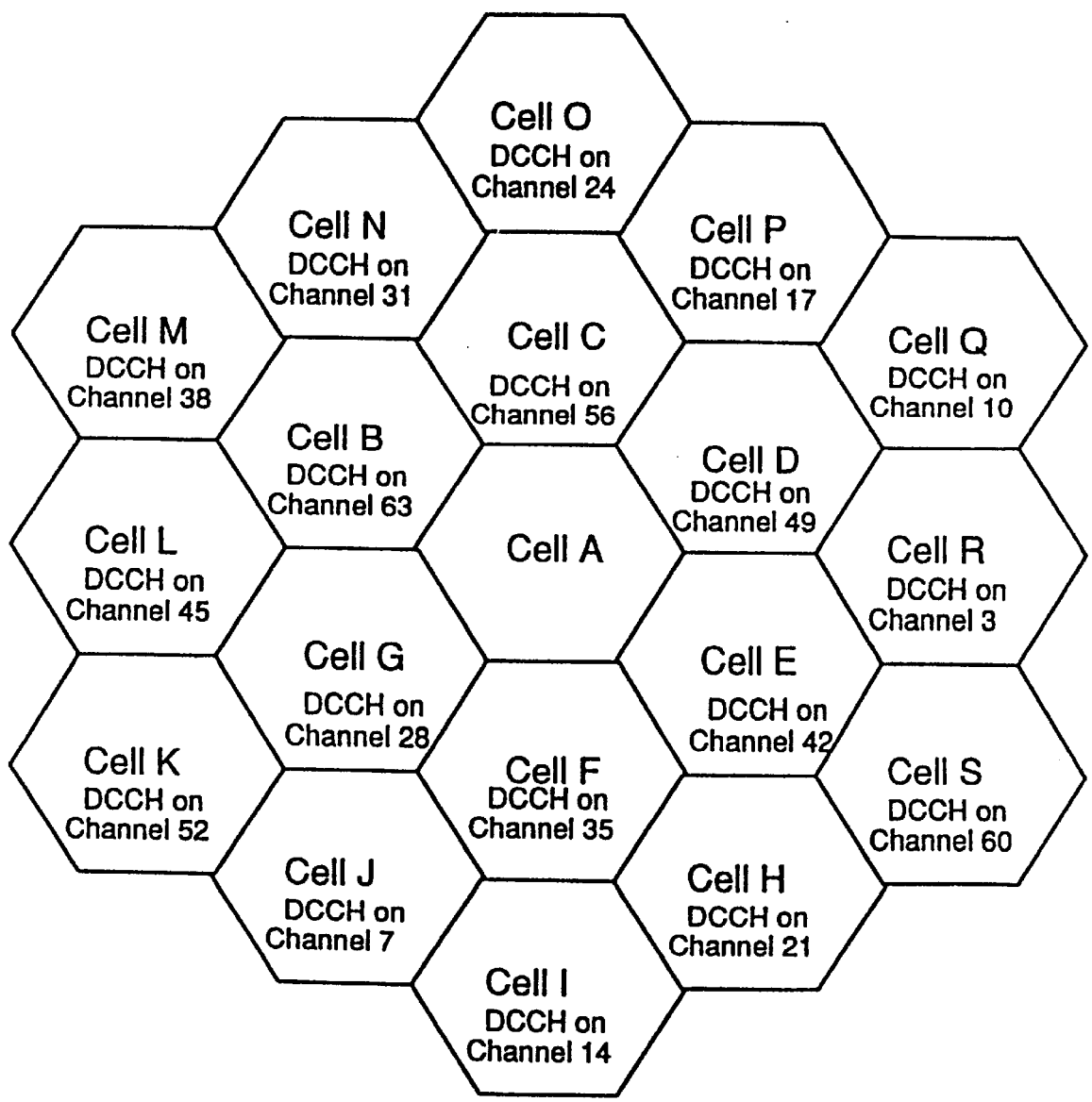
FIG. 2 shows the cells of the system shown in FIG. 1 with additional cells.

Referring now to FIG. 2 therein are shown cells Cell A–Cell J (also shown in FIG. 1) with additional neighboring cells Cell K–Cell S, that also comprise a portion of the same cellular system. Each of Cell K–Cell S may be configured identically to Cell A–Cell J as shown in FIG. 1, with a base station (not shown) located in each cell and Cell K–Cell S being controlled by one or more MSCs (not shown). In FIG. 2, Cell A is located in the center of the collection of Cell B–Cell S. Each of Cell B–Cell S has indicated within it an assigned DCCH channel number. For example, Cell B is assigned DCCH channel number 63 and Cell E is assigned DCCH channel number 42. The DCCH channel number assignments are conventionally fixed for an IS-136 cellular system.

The handoff may be done by the method of mobile assisted handoff (MAHO) specified in commonly assigned U.S. Pat. No. 5,200,957 to Dahlin, which is hereby incorporated by reference. During the procedure for call setup on digital communication channel, the base station informs the mobile station of radio channel frequency and also of a time slot that identifies the timeslot to be used and digital voice color code (DVCC). During the call setup procedure the base station also informs the mobile station of a plurality of DCCH channels the signal strength of which are to be measured by the mobile for handoff purposes. This plurality of DCCH channels are the DCCH channels of cells which comprise the neighbor cell list. As a mobile station involved in the ongoing cell moves among Cell A–Cell S of FIG. 2, the system will handoff control of call communications from cell to cell. Depending upon the movement of the mobile station, as well as other circumstances, a new plurality of DCCH channels will be selected and the corresponding neighbor cell list transmitted to the mobile station from the responsible base station during the course of the connection. During the course of the connection the mobile station measures the signal strength of signals on the given plurality of DCCH channels. Measurements are done during time slots not used by the digital communication channel.

The mobile station also measures signal strength on the digital communication channel used for the established connection and the bit error rate on the established connection. The mobile station transmits results of its measurements, preferably averaged, frequently to the base station, preferably twice a second.

The base station also measures signal strength on the digital communication channel used for the established connection and the bit error rate on the established connection. The base station processes and analyzes the results of its own measurements and the measurements of the mobile station for comparison with handoff criteria. When, according to the results and criteria, a handoff is desired, the base station informs the mobile switching center indicating at least one target base station assumed suitable for taking over the responsibility for the communication with the mobile.

The mobile switching center requests the target base station(s) to measure signal strength on a radio channel in the time slot used by the mobile for the established connection. The mobile switching center also informs the target base station on the digital color code used by the mobile station.

The target base station(s) tune(s) a receiver to the radio channel indicated by the mobile switching center and uses the time slot identifier of the indicated time slot for burst synchronization. The target base station checks the appearance of the digital verification color code indicated by the mobile switching center and measures the signal strength of the burst signal provided the digital verification color code is correct. The target base station then transmits the results of the signal strength measurement to the mobile switching center. The target base station also informs the mobile switching center on the result of the checking of the appearance of the digital verification color code, i.e., whether the digital verification color code appeared in the burst in the time slot of the radio channel.

The mobile switching center determines whether handoff to a target base station should be performed taking the results of the signal strength measurements of target base(s) into account as well as other circumstances, e.g. traffic load.

The invention herein is used to build a neighbor cell list for use in the above described MAHO process within the IS-136 system. Use of the invention allows creation of a neighbor cell list that accounts for irregular RF effects and radio wave propagation anomalies within the cells of the system.

Figure 3:
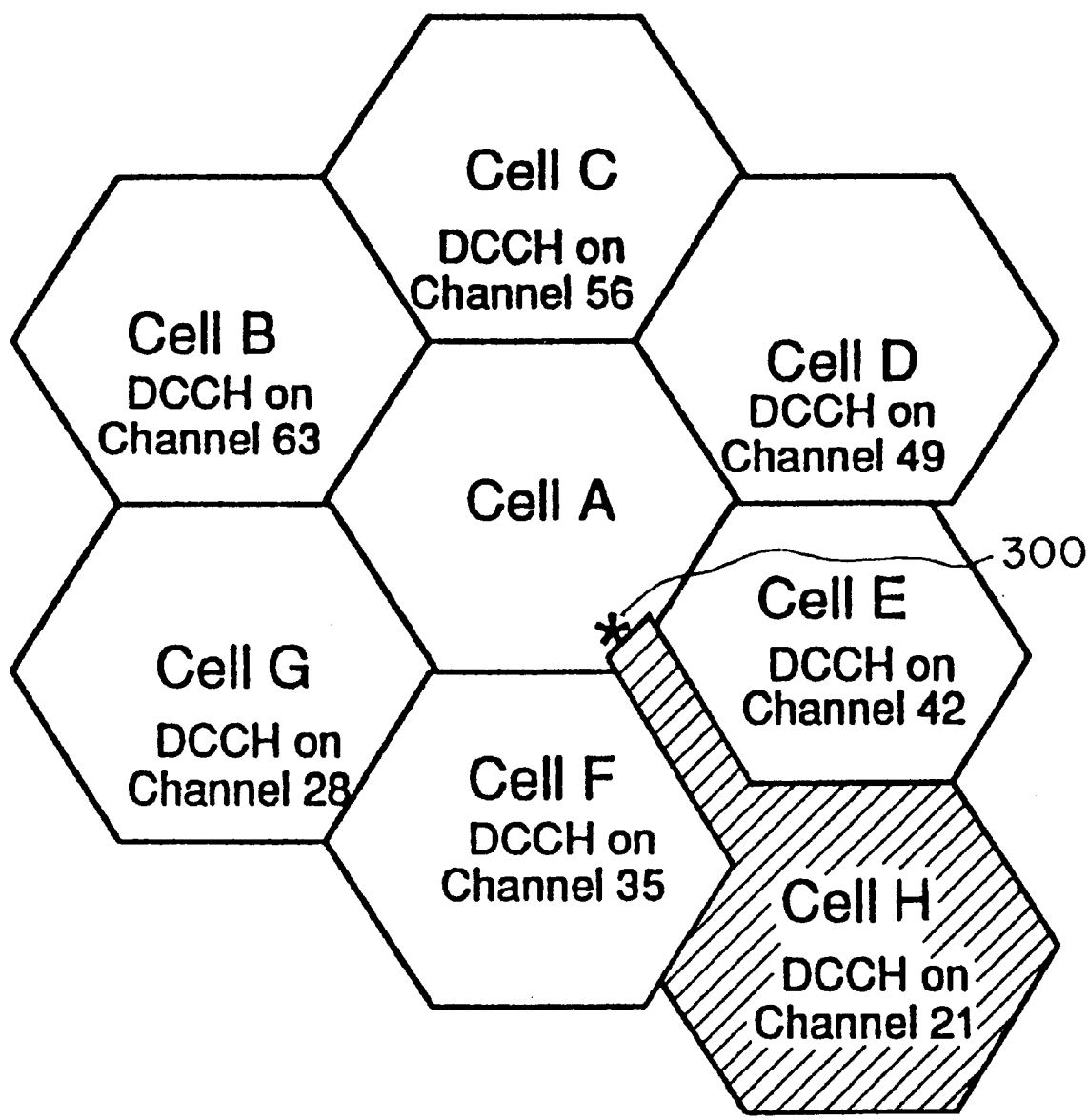
FIG. 3 illustrates a radio propagation island within the cellular system of FIG. 2.

For example, the situation with Cell A–Cell S of FIG. 2 may be such that RF propagation anomalies cause radio propagation islands to form. FIG. 3 illustrates a radio propagation island within the area covered by Cell A, Cell F, Cell E and Cell H of FIG. 2. In FIG. 3 it is shown that, because of geographic effects, or otherwise, the base station controlling Cell H, of all base stations in the system provides the strongest received and transmitted signal strength when communicating with mobile stations located in the shaded area. It would be desirable when a mobile station involved in a call is located at point 300 in FIG. 3 and moving from Cell A into Cell E or Cell F along the shaded area, that control of the cell be handed off from the base station of Cell A to the base station of Cell H. This is desirable since Cell H provides the best RF propagation. In this case, the most efficient neighbor cell list for Cell A must include Cell H.

A system operator who manually sets the neighbor cell list for Cell A relying on the model of ideal representation of cell coverage shown in FIG. 1 may, if the neighbor cell list is limited to less than 18 cells in size, not include Cell H in the manually created neighbor cell list. If this manually created neighbor cell list is used to indicate candidate handoff cells for handoff measurement purposes when mobile station M1 moves out of Cell A, call handoff would take place to the base station of either Cell E or Cell F. This may not provide as good a communications connection as is available with the base station of Cell H. Implementation of the invention within the system would solve this problem.

In the invention, a neighbor cell list for Cell A is created by periodically performing signal strength measurements within cell A on the DCCHs assigned to cells Cell B–Cell H. Uplink measurements are done at base station B1 (shown in FIG. 1) of Cell A and downlink measurements are performed by mobile stations located within Cell A and under the control of base station Bi at the time of measurement. For example, in the situation shown in FIG. 1 mobile stations M3, M4, M6 and M7 would perform the downlink signal measurements during a call. The signal strength measurements made at the mobile are transmitted to the system via the base station. The signal strength measurements are performed periodically over a period of time. The results of the signal strength measurements can be used to obtain an average signal strength for each of the DCCHs in Cell B–Cell S. As an alternative, the signal strength measurements can be used to determine the frequency or number of times a signal strength measurement above a certain threshold level was obtained on each of the DCCHs of Cell B–Cell S. The processing of the signal strength measurements is done by the base station controller, or alternatively, the measurement results can be sent to the MSC for processing. It will be obvious to a practitioner skilled in the art that signal strength measurements may be performed by numerous methods.

The method and system of the invention is implemented into a IS-136 system using Adaptive Channel Allocation (ACA) and the neighbor cell list is created by utilizing functions of the ACA feature.

In Adaptive Channel Allocation various measurements of signal quality and interference levels of dynamically allocated communications channels are performed to build a list of traffic or voice channels that may be assigned to a call made from within a cell. The interference levels are measured by measuring the signal strengths on channels allocated to neighboring cells. Typically, ACA is implemented in systems in which any cell may be assigned any dynamically allocated traffic or voice channel of the system. The base station controlling a cell and mobile stations within the cell's coverage area perform measurements on a set of channels that the system operator has assigned to be dynamically allocated for communications within the system. The system then builds for each cell a table of channels from the least interfered (highest quality) to the most interfered (lowest quality). The system then selects a certain number of least interfered channels from that list to allocate to communication in that cell. Other criteria, such as certain required frequency separation between the channels chosen and avoiding certain combinations of channels whose frequencies create intermodulation interference, are also considered in the selection of channels. Various methods at Adaptive Channel Allocation are well known to those having ordinary skill in the art. These known Adaptive Channel Allocation methods utilize various criteria for selecting channels for allocation.

For example, H. Eriksson, "Capacity Improvement by Adaptive Channel Allocation", *IEEE Global Telecomm. Conf.*, pp. 1355–1359, Nov. 28–Dec. 1, 1988, illustrates the capacity gains associated with a cellular radio system where all of the channels are a common resource shared by all base stations. In the above-referenced report, the mobile measures the signal quality of the downlink, and channels are assigned on the basis of selecting the channel with the highest carrier to interference ratio (C/I level).

It is preferable to implement ACA schemes in two parts: a "slow" part, and a "fast" part. The "slow" part determines, for each cell, a set of channels to be used based on interference and traffic fluctuations that occur over a relatively long period of time (e.g., 20–30 busy hours, which could take several weeks to occur). This eliminates the frequency planning problem, and may also adapt to average traffic loads in the system. The "fast" part is concerned with selecting at any given moment, from the slowly determined set of channels, the "best" channel for each connection, based on short term interference measurements. Implementation of both the "slow" and the "fast" parts of an ACA scheme may be distributed in the system, so that each base station determines its portion of the frequency plan as well as channel assignments based on local observations within the cell.

One reason for splitting an ACA scheme into two parts (i.e., "fast" and "slow") is because of the use of auto-tuned combiners that are mechanically tuned, by means of small motors, to desired frequency ranges. Tuning is an automatic, but slow, operation that cannot be performed when a call arrives at the cell.

In the invention the neighbor cell list creation process for a particular cell in the IS-136 system is implemented by including the DCCH channels of neighboring cells in the list of channels to be measured for ACA within that cell. The ACA process used in this first embodiment utilizes the measurement process of the MAHO process described above to perform channel measurements at the mobile station. The ACA measurements at the mobile station are performed by placing a different channel from the ACA list in the list of channels included with the MAHO measurement order transmitted at each call setup.

Base station ACA measurements are made at the base station of each cell of the system using the same ACA list. In the invention the DCCH channels of neighboring cells are also added to the base station ACA list. The base station then performs periodic measurements on the channels in the ACA list.

To create a neighbor cell list for a particular cell, the process of the invention adds the extra channel or channels from the ACA list to the channels of cells contained in an initial neighbor cell list used for MAHO measurements. The initial neighbor cell list for a cell consists of the immediate neighbors of that cell as determined by the ideal hexagonal representation of cell shape. For example, the initial neighbor cell list for Cell A of FIG. 2 would consist of Cell B–Cell G. At each call setup within a cell for which a neighbor cell list is to be created, the extra ACA channel is included in the MAHO measurement order.

Continuing using Cell A as an example, as a call setup is made in Cell A, a mobile station will receive a MAHO measurement list including the DCCH channels of Cell B–Cell G, and an additional channel taken from the ACA list. The additional channel could include one of the channels to be dynamically allocated within the system or, a DCCH channel of Cell H–Cell S. Each time a new call setup occurs, a different channel from the ACA list is used. The ACA measurements including the DCCH channels are collected by the system over a relatively long period of time preferably 20–30 busy hours, which could take several weeks to occur. An ordered interference level table is then created within the base station controller or MSC from these ACA measurements.

From the standpoint of Cell A the DCCH channel frequencies of Cell B–Cell G (and certain other cells of Cell H–Cell S) will exhibit a lot of interference (strong signal strength) compared to other DCCH channel frequencies of the system since these cells are located close to Cell A. Base station B1 will measure an amount of interference on the DCCH uplink frequencies of Cell B –Cell G comparatively larger than the amount of interference measured on the DCCH channels of other cells since there are mobile stations continuously registering and making call accesses on these channels. B1 will also measure much interference on the DCCH uplink frequency of Cell H since the coverage area of Cell H overlaps the coverage areas of Cell E and Cell F. The mobile stations located within Cell A which collectively measure on all DCCH downlink frequencies will measure an amount of interference on the DCCHs of Cell B–Cell G, and Cell H, larger than that measured on the DCCH channels of other cells since the neighboring base stations are continuously transmitting on these frequencies.

Referring now to FIG. 4A, therein is shown a flow diagram illustrating measurement steps performed by each mobile station during each call within a particular cell according to the first embodiment of the invention. At step 602 the mobile station receives the MAHO list from the MSC via the base station. The MAHO list includes the extra channel for ACA measurements during call setup. The ACA measurement process is modified to include the DCCH channel numbers of neighboring cells so that a neighbor cell list can be created according to the invention. Next, at step 604 the mobile station measures the interference level (signal strength) on the downlink of each channel in the measurement list during the MAHO measurement process. Next, at step 606 the mobile station transmits the measurement results to the MSC via the base station controlling the cell. The process then moves to step 608 where it is determined if the call is over. If the call is over the process ends. If, however the call is ongoing the process returns to step 604 and, after an appropriate delay, repeats the interference level measurements. The process of FIG. 4A is repeated for every call set up within a cell of the system.

Referring now to FIG. 4B, therein are shown the steps performed within the base station according to the first embodiment of the invention. The process begins at step 610 as the base station receives the ACA measurement list from the MSC. The ACA measurement list for the base station contains all the ACA channels as well as the DCCH channels of neighboring cells. Next, the process moves to step 612 as the base station waits for a measurement timer signal. The measurement timer signal is generated by the base station controller depending upon the desired ACA measurement period. Upon receiving a measurement timer signal at step 614, the process moves to step 616 where the base station measures uplink interference (signal strength) on each measurement channel in the measurement list. Next at step 618 the base station transfers the results to the MSC. From step 618 the process then returns to step 612. This process is repeated periodically according to the measurement timer signal.

Figure 4C:
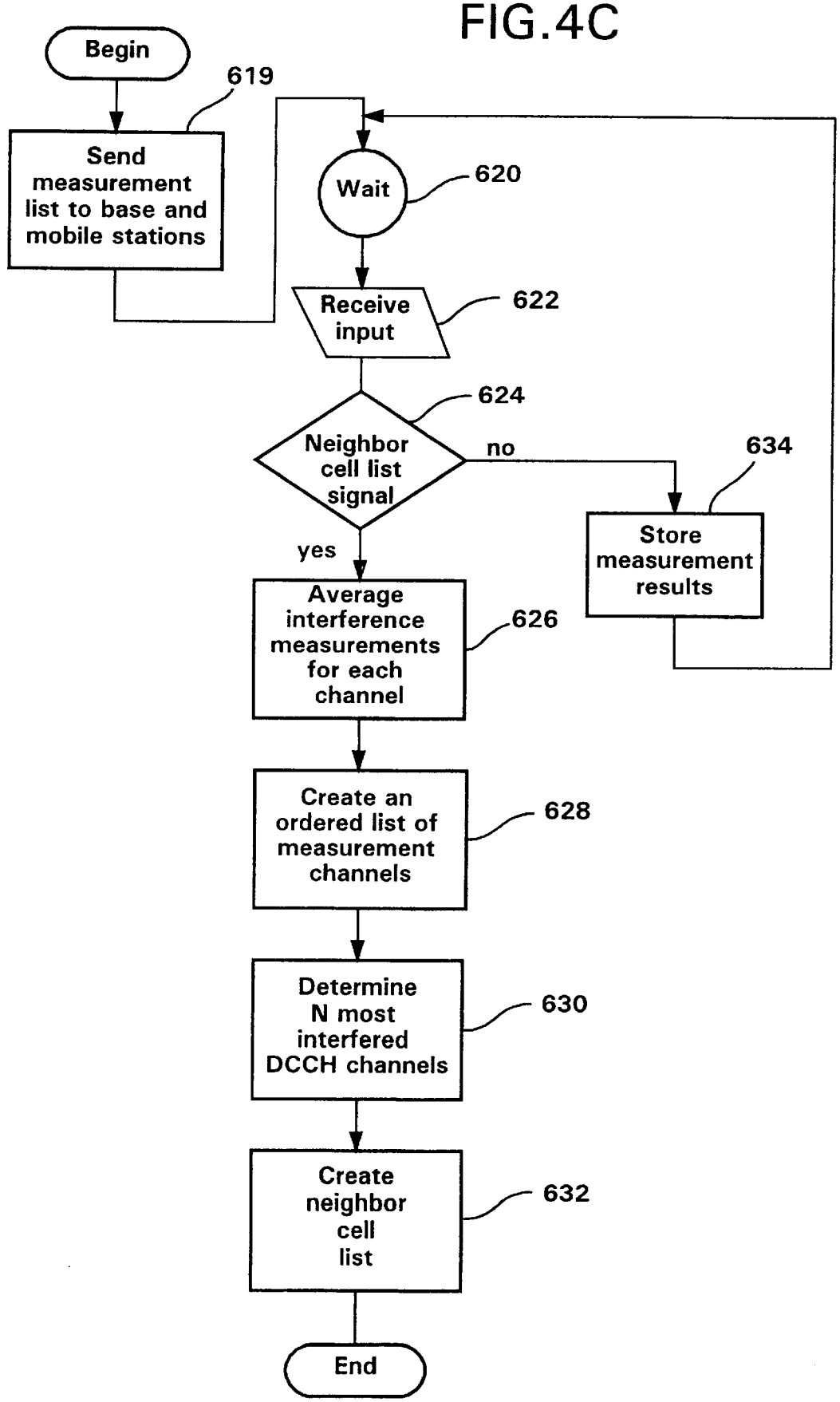

Referring now to FIG. 4C, therein are shown the steps performed within the MSC according to the first embodiment of the invention. At step 619 the measurement process begins as the MSC sends the base station and mobile station measurement lists to the base station. The mobile station measurement list will then be further transmitted to the mobile station from the base station. From step 619 the process then moves to the wait state of step 620. At step 622 the MSC receives an input. The input is either a set of measurement results from a mobile station or base station or, a neighbor cell list signal. The measurement results will be received over a period of time, whenever the mobile station transmits results to the system or the base station transfers measurement results to the MSC. The neighbor cell list signal is received from a system timer and indicates that it is time to average the interference measurements. Next, at step 622 it is determined what type of input was received. If measurement results were received the process moves to step 634 where the results are stored. From step 634 the process returns to step 620. If, however, a neighbor cell list signal was received, the process moves to step 626 where the stored measurement results are averaged to create an average interference level for each measurement channel. Next, at step 628 the MSC controller creates an ordered list of all measurement channels for which measurement results were received.

Referring now to FIG. 5, there is shown an example of a table of Channel Numbers built from measurements performed by modifying Adaptive Channel Allocation for Cell A according to the teachings of the present invention. The table in FIG. 5 shows Channel Numbers used within Cell A–Cell S of FIG. 2 ranked from least interfered (lowest received average signal strength) to most interfered (highest received average signal strength), as measured at the base station B1 and at mobile stations located within Cell A during ACA measurement times. In FIG. 5, the DCCH channels of Cell B–Cell G and of Cell H are located at or near the bottom of the table. The DCCH channels of these cells are therefore among the most interfered channels as measured within the coverage area of Cell A.

From step 626 the process moves to step 628, where the MSC controller determines the N most interfered DCCH channels in the ordered measurement list.

In order to create the neighbor cell list for any cell, a number (N) of the most interfered DCCH channels are determined from the table of FIG. 5. The N most interfered DCCH channels are the N channels having the N highest received signal strengths.

Next, at step 632 a neighbor cell list is created. Continuing with the example of Cell A, the N most interfered DCCH channels, if not already contained in the list, are added to the initial neighbor cell list containing the DCCH channels of Cell B–Cell G. If the DCCH channels of any of cells Cell B–Cell G are not in the group of N cells they may be removed from the initial list. This same result may be accomplished by simply replacing the initial neighbor cell list with the N most interfered DCCH channels.

As an alternative, the neighbor cell list for Cell A may be created by taking the DCCH channels from the table of FIG. 5 that have an interference level above a certain threshold, rather than taking a set number of N channels. The threshold may be set to create a neighbor cell list within a desired size limit.

For the system of FIGS. 1–4, if the ACA measurements are collected over a statistically valid time period, Cell H will be among the cells added to the initial neighbor cell list. As an alternative, a certain number of the cells Cell B–Cell S having the most interfered DCCH channels could be placed in the neighbor cell list for Cell A, without using interference threshold criteria.

If a mobile station happens to be located at location 300 in FIG. 3 and moving into the coverage area of Cell H, the MAHO process will result in a call handoff to Cell H as long as the neighbor cell list created is of a size $N \geq 7$.

By implementing the present method and system within a cellular system it would not be necessary to include all of the eighteen cells in FIG. 2, Cell B–Cell S, that are closely proximated to Cell A in the neighbor cell list to overcome problems caused by RF propagation effects such as that illustrated in FIG. 3. The size of the neighbor cell list could be set to a value of N less than eighteen by using an appropriate interference threshold when choosing DCCH channels for the list, or by placing a set number of most interfered DCCH channels in the list. If the system operator desired to have high signal strength measurement precision for handoff, the threshold could be set high or the set number of DCCH channels chosen could be minimized to account for only the strongest RF propagations effects such as that shown in FIG. 3. The nearer the value of N to eighteen the greater the number of RF propagation effects accounted for.

Once a neighbor cell list has been created, the method and system of the present invention may be used to periodically verify the neighbor cell list. The verification is done by continuing to make measurements with the ACA measurement list modified as before but also now including the DCCH channels of all neighbor cells.

Again, using Cell A as an example, a neighbor cell list created by the method and system of the present invention is verified by continuing to use the DCCH channels of Cell B–Cell S in the ACA measurement list. Measurements on DCCH channels contained in the ACA measurement list are made as before. After measurements have been made over a relatively long period of time as before (20–30 busy hours, or several weeks). The existing neighbor cell list is compared with the list of cells having a DCCH channel interference level above a certain threshold. If a cell in the existing neighbor cell list is not contained in the list of cells having an interference level above the certain threshold, that cell is removed from the neighbor cell list. If a cell having an interference level above the certain threshold is not contained in the existing neighbor cell list, that cell is added to the neighbor cell list. In the alternative, the N most interfered DCCH channels, where N equals the number of DCCH channels in the neighbor cell list, could be compared to the neighbor cell list.

The method and system is also useful when a system operator installs a new cell site within a cellular system. In this case relatively short term measurements according to the invention could be used to initially set a neighbor cell list for the new cell. The neighbor cell list of cells surrounding the new cell could also be set by short term measurements. Use of short term measurements would allow the system operator to get the cell installed and operating quickly.

Longer term measurements could then be performed as described above to verify the neighbor cell list created for the new cell and cells that surround it.

The number of DCCH channels on which signal strength is measured may be much larger than the actual neighbor cell list. The only limitation on this DCCH channel list is that it is preferable that no two cells on the list have the same measurement channel number. It will be obvious to those skilled in the art that there are clear advantages to ensuring that the measurement channel number frequencies are not repeated, if only for the purpose of MAHO.

While the invention has been described as implemented into the IS-136 system, it will be obvious to one skilled in the art that the invention has equal applicability to the IS-54B, the EIA/TIA-553, or similar systems. In IS-54B the invention would operate similarly to that disclosed for an IS-136 system, with the exception that the analog control channel (ACCH) would be used in place of the DCCH channel. In EIA/TIA-553 the measurements would be made only at the base station of the pertinent cell, since analog mobiles are not capable of performing MAHO.

It would also be obvious to one skilled in the art that other methods may be used to perform the downlink measurements at the mobile station. For example, the mobile assisted channel allocation (MACA) of IS-136 may be used to measure DCCH channel strength in an IS-136 system. MACA is an IS-136 option in which the system instructs idle mobile stations to make signal strength measurements when idle and report the measurements to the system upon a call or registration access.

The above described embodiments of the invention are also suited for implementation into systems that include cells such as cells Cell A–Cell S of FIGS. 1–3, that are divided into a number of smaller microcells. For example, if a number of microcells share the coverage area of Cell A, handoffs between Cell A and these microcells would be frequent. Also, if other neighboring cells contained microcells, handoffs between Cell A and these neighboring microcells may also be frequent. It would be useful in this example to define some of these microcells as neighbor cells to Cell A. By including the DCCHs of these microcells among the DCCHs to be measured in the invention, any microcells belonging in the neighbor cell list will be included.

As can be seen from the above description, the method and system of the invention allows creation of a neighbor cell list which takes into account variations in the size and shape of the coverage area of cells within a cellular system. The invention also allows the neighborhood cell list to be verified periodically to account for long term effects on the size and shape of the coverage areas of the cells in the list.

It is believed that the operation and construction of the present invention will be apparent from the foregoing description and, while the invention shown and described herein has been characterized as particular embodiments, changes and modifications may be made therein without departing from the spirit and scope of the invention as defined in the following claims.

What is claimed is:

1. In a cellular telecommunications system comprising a plurality of mobile stations, a first cell, and a plurality of neighbor cells, said neighbor cells each comprising at least one base station transmitting and receiving on one or more measurement channels, a method of creating a neighbor cell list for said first cell, said neighbor cell list used for transmission to mobile stations thereby enabling mobile stations to select candidate cells for handoff from said first cell, said method comprising the steps of:

establishing a first neighbor cell list for said first cell;

over the course of a plurality of calls by mobile stations within said first cell:
    measuring by those mobile stations in said first cell of signal strength on measurement channels of a group of neighbor cells including cells not in the first neighbor list; and
    sending the signal strength measurements by those mobile stations to the cellular telecommunications system; and processing by the cellular telecommunications system after the plurality of calls of the mobile station sent signal strength measurements, said step of processing including the steps of:
    creating an ordered list of said measurement channels, said list ordered according to said signal strength measurements obtained by the mobile stations over the course of the plurality of calls;
    determining one or more of the measurement channels from said ordered list having highest signal strength; and
    modifying said first neighbor cell list for said first cell to include the neighbor cells associated with said determined one or more measurement channels having highest signal strength.

2. The method of claim 1 in which said step of creating an ordered list comprises the steps of:
    averaging said signal strength measurements to obtain an averaged signal strength measurement for each of said selected measurement channels; and
    creating said ordered list of said measurement channels, said list ordered according to said averaged signal strength measurements.

3. The method of claim 1 in which said step of determining comprises the steps of:
    identifying one or more measurement channels of said ordered list having a signal strength measurement level above a certain signal strength level threshold.

4. In a cellular telecommunications system comprising a plurality of mobile stations, a first cell and a plurality of neighbor cells, each of said neighbor cells comprising a base station transmitting and receiving on one or more measurement channels, a method of verifying a neighbor cell list for said first cell, said neighbor cell list used for transmission to mobile stations thereby enabling mobile stations to select candidate cells for handoff from said first cell, said method comprising the steps of:

assigning a first group of said neighbor cells to said neighbor cell list;

over the course of a plurality of calls by mobile stations within said first cell:
    measuring by those mobile stations in said first cell of signal strength on a measurement channel of each of said neighbor cells including cells not in the first group; and
    sending the signal strength measurements by those mobile stations to the cellular telecommunications system; and processing by the cellular telecommunications system after the plurality of calls of the mobile station sent signal strength measurements, said step of processing including the steps of:
    creating an ordered list of said neighbor cells, said list ordered according to said signal strength measurements obtained by the mobile stations over the course of the plurality of calls; and reconfiguring said neighbor cell list according to said created ordered list, said step of reconfiguring comprising the steps of:

determining if any of said neighbor cells on the created ordered list have a signal strength measurement above a threshold value; and assigning those neighbor cells from the created ordered list having a signal strength measurement above said threshold value to said neighbor cell list.

5. The method of claim 4 in which said step of creating an ordered list comprises the steps of:

averaging said signal strength measurements to obtain an averaged signal strength measurement for each of said neighbor cells measurement channels of said neighbor cells; and creating said ordered list of said neighbor cells, said list ordered according to said averaged signal strength measurements for each of said neighbor cells.

6. The method of claim 5 in which said step of reconfiguring further comprises the steps of:

determining a second group of neighbor cells having highest averaged signal strength measurements;

deleting neighbor cells within said first group from said neighbor cell list; and assigning neighbor cells of said second group to said neighbor cell list.

7. The method of claim 5 in which said step of reconfiguring further comprises the step of:

adding neighbor cells associated with one or more measurement channels having highest signal strength of said ordered list to said neighbor cell list.

8. The method of claim 4 in which said step of reconfiguring further comprises the steps of:

determining if any of said neighbor cells contained in said first group have an averaged signal strength measurement below said threshold value; and removing neighbor cells contained in said first group having a signal strength measurement below said threshold from said neighbor cell list.

9. In a cellular telecommunications system comprising a plurality of mobile stations, a first cell, and a plurality of neighbor cells, said neighbor cells each comprising at least one base station transmitting and receiving on one or more measurement channels, a method for creating a neighbor cell list for said first cell, said neighbor list for transmission to mobile stations thereby enabling mobile stations to select candidate cells for handoff from said first cell, said method comprising the steps of:

establishing a first neighbor cell list for said first cell;

over the course of a plurality of calls by mobile stations within said first cell:

measuring by a base station for the first cell of signal strength on measurement channels of a group of neighbor cells including cells not in the first neighbor list; and sending the signal strength measurements by the base station to the cellular telecommunications system; and processing by the cellular telecommunications system after the plurality of calls of the base station sent signal strength measurements, said step of processing including the steps of:

creating an ordered list of said measurement channels, said list ordered according to said signal strength measurements obtained by the base station over the course of the plurality of calls;

determining one or more of the measurement channels from said ordered list having highest signal strength; and modifying said first neighbor cell list for said first cell to include the neighbor cells associated with said determined one or more measurement channels having highest signal strength.

10. The method claim 9 in which said step of creating an ordered list comprises the steps of:

averaging said signal strength measurements to obtain an averaged signal strength measurement for each of said selected measurement channels; and a creating said ordered list of said measurement channels, said list ordered according to said averaged signal strength measurements.

11. The method of claim 9 in which said step of determining comprises the step of:

identifying one or more measurement channels of said ordered list having a signal strength measurement level above a certain signal strength level threshold.

12. In a cellular telecommunications system comprising a plurality of mobile stations, a first cell and a plurality of neighbor cells, each of said neighbor cells comprising a base station transmitting and receiving on one or more measurement channels, a method for verifying a neighbor cell list for said first cell, said neighbor cell list used for transmission to mobile stations thereby enabling mobile stations to select candidate cells for handoff from said first cell, said method comprising the steps of:

assigning a first group of said neighbor cells to said neighbor cell list;

over the course of a plurality of calls by mobile stations within said first cell:

measuring signal strength by a base station for said first cell on measurement channels of each of said neighbor cells including cells not in the first group; and sending the signal strength measurements by the base station to the cellular telecommunications system; and processing by the cellular telecommunications system after the plurality of calls of the base station sent signal strength measurements, said step of processing including the steps of:

creating an ordered list of said neighbor cells, said list ordered according to said signal strength measurements obtained by the base station over the course of the plurality of calls; and reconfiguring said neighbor cell list according to said created ordered list, said step of reconfiguring comprising the steps of:

determining if any of said neighbor cells on the created ordered list have a signal strength measurement above a threshold value; and assigning those neighbor cells on the created ordered list having a signal strength measurement above said threshold value to said neighbor cell list.

13. The method of claim 12 in which said step of creating an ordered list comprises the steps of:

averaging said signal strength measurements to obtain an averaged signal strength measurement for each of said neighbor cells measurement channels of said neighbor cells; and creating said ordered list of said neighbor cells, said list ordered according to said averaged signal strength measurements for each of said neighbor cells.

14. The method of claim 13 in which said step of reconfiguring further comprises the steps of:

determining a second group of neighbor cells having highest averaged signal strength measurements;

deleting neighbor cells within said first group from said neighbor cell list; and assigning neighbor cells of said second group to said neighbor cell list.

15. The method of claim 13 in which said step of reconfiguring further comprises the step of:

adding neighborhood cells associated with one or more measurement channels having highest signal strength of said ordered list to said neighbor cell list.

16. The method of claim 12 in which said step of reconfiguring further comprises the steps of:

determining if any of said neighbor cells contained in said first group have an averaged signal strength measurement below said threshold value; and removing neighbor cells contained in said first group having a measurement signal strength below said threshold from said neighbor cell list.

* * * * *

UNITED STATES PATENT AND TRADEMARK OFFICE
CERTIFICATE OF CORRECTION

PATENT NO. : 5,915,221
DATED : Jun. 22, 1999
INVENTOR(S) : Sawyer et al.

It is certified that error appears in the above-identified patent and that said Letters Patent is hereby corrected as shown below:

Column 4, lines 41-42   Replace "controllPatent Appverage"
                        With --controlling the coverage--

Column 8, line 31       Replace "Bi"
                        With --B1--

Column 16, line 12      Before "claim"
                        Insert --of--

Column 16, line 17      Before "creating"
                        Remove --a--

Signed and Sealed this

Eighteenth Day of April, 2000

Attest:

Q. TODD DICKINSON

*Attesting Officer*   *Director of Patents and Trademarks*